United States Patent [19]

Stark

[11] Patent Number: 5,025,539
[45] Date of Patent: Jun. 25, 1991

[54] DRILLING AND MILLING MACHINE

[75] Inventor: Gerhard Stark, Notzingen, Fed. Rep. of Germany

[73] Assignee: Stama Maschinenfabrik GmbH, Fed. Rep. of Germany

[21] Appl. No.: 455,365

[22] PCT Filed: Jun. 2, 1989

[86] PCT No.: PCT/EP89/00619
§ 371 Date: Jan. 11, 1990
§ 102(e) Date: Jan. 11, 1990

[87] PCT Pub. No.: WO89/11951
PCT Pub. Date: Dec. 14, 1989

[30] Foreign Application Priority Data

Jun. 3, 1988 [DE] Fed. Rep. of Germany ....... 3818903

[51] Int. Cl.⁵ .............................................. B23P 23/02
[52] U.S. Cl. .................................... 29/26 A; 408/25; 408/28; 408/62
[58] Field of Search ..................... 408/25, 28, 29, 30, 408/62, 71; 29/26 A

[56] References Cited

U.S. PATENT DOCUMENTS

| | | | |
|---|---|---|---|
| 1,096,718 | 5/1914 | Hoff | 408/28 |
| 1,198,797 | 9/1916 | Waterman | 408/29 |
| 2,354,414 | 7/1944 | Walter | 29/26 |
| 4,578,311 | 5/1975 | Link et al. | 82/2 R |

FOREIGN PATENT DOCUMENTS

| | | |
|---|---|---|
| 1264927 | 3/1968 | Fed. Rep. of Germany . |
| 2224761 | 11/1973 | Fed. Rep. of Germany . |
| 8313200 | 8/1983 | Fed. Rep. of Germany . |
| 3420531 | 12/1985 | Fed. Rep. of Germany . |
| 3633691 | 7/1987 | Fed. Rep. of Germany . |
| 3632319 | 3/1988 | Fed. Rep. of Germany . |
| 1578165 | 7/1969 | France . |
| 2115128 | 7/1972 | France . |
| 2380099 | 8/1978 | France . |
| 2578777 | 9/1986 | France . |
| 446856 | 3/1968 | Switzerland . |
| 2061159 | 5/1981 | United Kingdom . |

Primary Examiner—Daniel W. Howell
Attorney, Agent, or Firm—Webb, Burden, Ziesenheim & Webb

[57] ABSTRACT

A drilling and milling machine comprises a travelling pillar (20) having a tool spindle (25) which is movable along its own spindle axis (Z) and along the two further axes (X, Y) of a three-dimensional coordinate system (X, Y, Z), and a workpiece carrier (30) which is stepwise rotatable about a pivot axis (A). The pivot axis (A) extends horizontally and at right-angles to the spindle axis (Z). The workpiece carrier (30) is constructed for clamping a material bar (18), the axis of which coincides with the pivot axis (A) and the end portion of which forms a workpiece (18') to be machined by the workpiece spindle (25). On the travelling pillar (20) a severing unit (26) is arranged which in each operating cycle severs a machined workpiece (18') from the workpiece bar (18). The resulting partition face can then be further machined by the drilling and milling machine.

5 Claims, 4 Drawing Sheets

DRILLING AND MILLING MACHINE

The invention relates to a drilling and milling machine comprising
a workpiece carrier which is formed for clamping a material bar and is pivotal stepwise about a horizontal pivot axis which coincides with the axis of the material bar and
at least one tool spindle which has a spindle axis arranged at right-angles to the pivot axis and is adjustable along said spindle axis.

For cutting machining of workpieces two essentially different machining types are known. Firstly, the workpiece to be machined can be turned whilst the tool is kept stationary and secondly the workpiece to be machined can be clamped stationary whilst the tool is moved. The former type of machining takes place for example on a lathe and the latter in so-called machining centres such as drilling and milling machines.

If with a lathe a great number of small parts is to be made from a long material bar by cutting machining the material bar must be turned at high rotational speed and this involves problems which can be solved only with considerable expenditure.

Conventional drilling and milling machines with vertical or horiztonal arrangement of the drilling or milling tool have the disadvantage that they can only machine workpieces which have previously been brought to a suitable size, for example have been sawn or cast. Each individual workpiece must be fixed by means of a clamping or chuck device on the machine table of the drilling and milling machine. If several sides of the workpiece are to be machined and closely adjacent bores formed it is frequently necessary to effect several clampings of the workpiece. For this purpose, clamping or chucking means are required which usually have to be specially designed and made for each workpiece. With changing clampings of a workpiece accuracy problems arise and their solution also involves high costs. The cutting power in cutting machining may also be limited by limited stability of the clamping of the workpiece.

The aforementioned remarks apply particularly to a machine tool known from DE 3632319 Al and comprising a drilling and milling spindle head mounted for travel on a machine frame in vertical (Z) direction in which on the machine frame a centering clamping means for workpieces is mounted. The centering clamping means has the form of a turret chuck and is rotatable with a motor into the particularly desired angular position of the workpiece. A coordinate control makes it possible to turn the workpiece about its longitudinal axis with high precision. Consequently, drilling and milling work can be carried out at any desired surface area portions of the workpiece. The drilling and milling spindle head is guided on stationary columns. The workpiece is clamped during the machining in at least one clamping head which is arranged on a tool carriage movable in X and Y direction. During the machining the centering clamping means is open so that the workpiece is movable by moving the tool carriage in the X direction and, limited by the passage width of the centering clamping means, also in the Y direction.

The automation of the feed of the blanks and carrying away of the finished workpieces requires considerable expenditure in conventional drilling and milling machines. Thus, for this purpose pallet changers and pallet magazines are used which even further multiply the high expenditure described above for clamping fixtures. Technically complicated robots and portal loading means require at least twice the expenditure for clamping means unless long waiting times of the machine can be accepted.

The invention is based on the problem of configuring a drilling and milling machine in such a manner that with simple and economic means an automatic feed of the blanks for multiside machining of the workpieces is possible as well as their automatic carrying away after completion.

According to the invention this problem is solved in a drilling and milling machine of the type described at the beginning by
a travelling pillar which is displaceable in a direction parallel to the pivot axis and in a direction at right-angles to the pivot axis and to the spindle axis and carries the tool spindle, and
a severing unit which is also arranged on the travelling pillar and is constructed for severing a portion of the material bar which projects out of the workpiece carrier into the working region of the tool spindle.

Thus, according to the invention the work is carried out literally from the bar itself. The workpieces need not be sawn or specially cast before the cutting machining but are worked directly on the rod or bar and then cut off.

Advantageous further developments of the invention will be apparent from the subsidiary claims.

With the invention drilling and milling machines can be used beyond the now normal two-shift operation. The drilling and milling machine according to the invention permits automatic unattended operation, for example during the night or at weekends.

Hereinafter an example of embodiment of the invention will be described in detail with the aid of the drawings, wherein:

FIG. 4b is a view in the direction of the arrow b in FIG. 4a.

Figure 1:
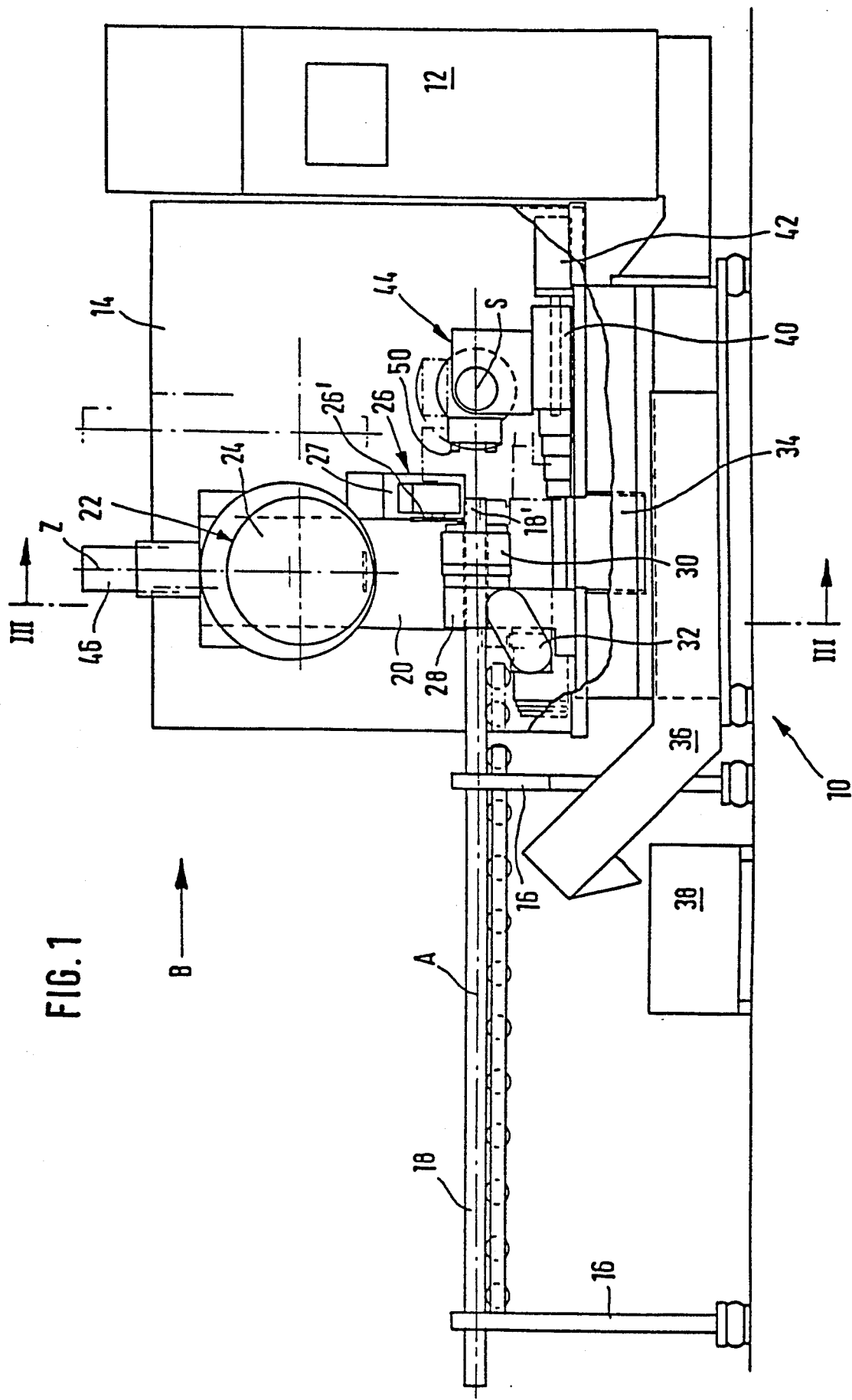
FIG. 1 is a side view of a drilling and milling machine.

In accordance with FIG. 1 the drilling and milling machine comprises a machine frame 10 and a conventional switch cabinet 12. The working region of the drilling and milling machine is covered by an at least partially transparent protective housing 14.

On a support 16 bar stock or material 18 is guided, the right end portion 18' thereof according to FIG. 1 forming the workpiece to be machined. The longitudinal axis of the material bar 18 is denoted by A; it is horizontal. A travelling column 20 known per se projects vertically from the machine frame 10. The travelling column 20 is movable along an axis X1 parallel to the axis A and at a right-angle thereto along a likewise horizontal axis Y1. Guided on the travelling column 20 is a vertical machining means 22; the latter carries a tool spindle 25 (FIG. 3) of which the axis forms the Z axis of a three-dimensional coordinate system and in the example of embodiment is vertical. Furthermore, a tool magazine 24 likewise known per se is arranged rotatably about its own axis W on the travelling column 20.

Figure 2:
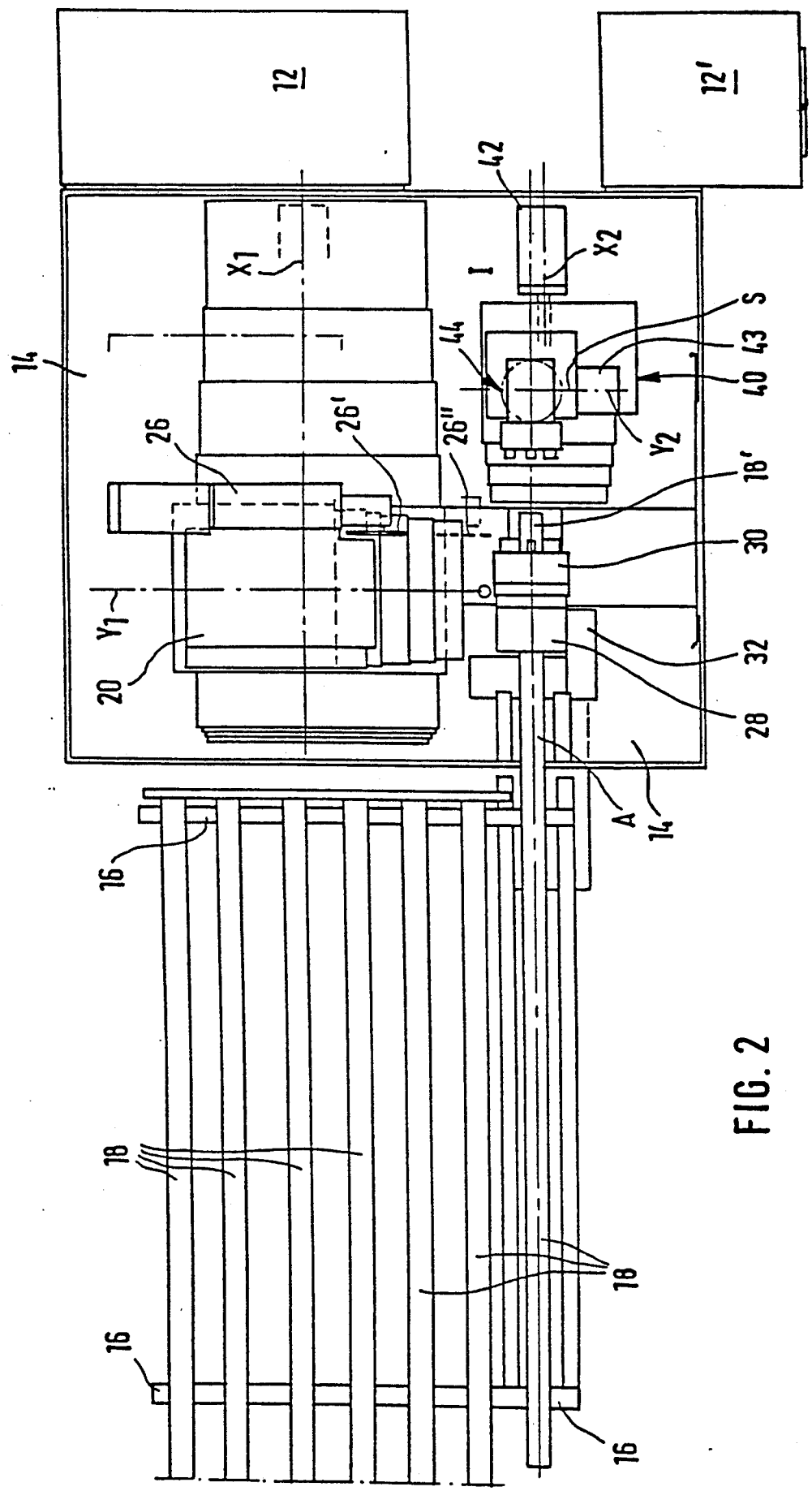
FIG. 2 is the associated plan view.
Figure 3:
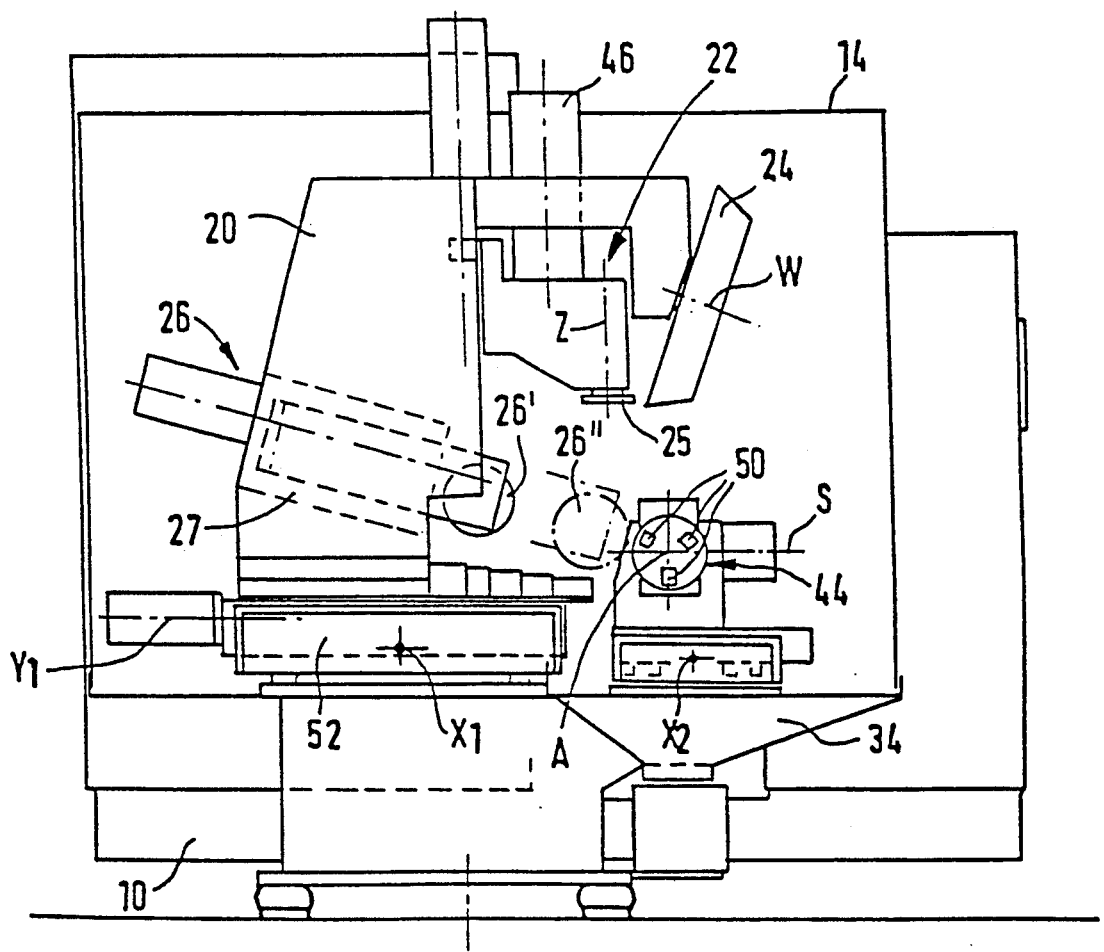
FIG. 3 is a section along III—III of FIG. 1.

According to FIGS. 1, 2 and 3 a severing unit 26 is arranged on a carriage or slide 27 which is guided directly on the travelling column 20, i.e. is movable with the latter. The severing unit 26 comprises a circular saw 26' and is movable by means of the travelling column 20 parallel to the longitudinal axis A of the bar stock. Thus, the circular saw 26' can be positioned axially with respect to the workpiece 18'. For sawing the workpiece 18' off the material bar 18 the circular saw 26' is moved by means of its slide 27 radially with respect to the longitudinal axis A of the bar stock 18.

In accordance with FIGS. 1 and 2 on the machine frame 10 a circular table 28 is arranged in such a manner that it is rotatable about the longitudinal axis A of the material bar 18. The circular table 28 comprises in the centre a hole through which the material rod or bar 18 extends so that its end portion 18' forming the workpiece projects into the working area of the tool spindle 25. In FIG. 1 at the right side of the circular table 28, a jaw chuck is disposed as a workpiece carrier 30 with which the material bar 18 can be clamped just before its end portion 18' so that the end portion 18' in the cutting machining is precisely positioned by means of a tool clamped in the tool spindle 25. In the cutting machining of the end portion 18' the material bar 18 does not move.

For turning the material bar 18 into different working positions in which the end portion 18' is worked by at least one tool clamped into the tool spindle 25, the circular table 28 is turned incrementally about the axis A. The end portion 18' can thus be turned into any desired position with respect to the tool; in particular, with a cubic workpiece all four peripheral sides can be positioned opposite the tool for machining. The circular table 28, the workpiece carrier 30 fixedly connected thereto and the material bar 18 clamped therein are rotationally drivable by means of a drive 32 stepwise about the axis A.

The chips forming in the machining of the workpiece pass via a chip chute 34 and a chip conveyor 36 into a chip container 38.

A compound slide arrangement 40 is movable by means of two drives 42 and 43 parallel and transversely to the longitudinal axis A of the material bar 18 in the direction of the axes X2 and Y2. FIG. 1 shows a first variant of the compound slide arrangement 40. In this case a grip and pivot unit 44 is mounted on the compound slide arrangement 40. By means of grippers 50 the workpiece 18' can be gripped; after sawing off the workpiece 18' by means of the circular saw 26' (FIG. 1) the grip and pivot unit 44 can be pivoted about an axis S which intersects the longitudinal axis A of the material bar 18 at right-angles. After pivoting through 90° the compound slide arrangement 40 is moved to the left in FIG. 1; thus, the previously still unworked partition face of the workpiece 18' can be positioned opposite the tool of the tool spindle 25 and worked.

It is also possible to clamp in the tool spindle 25 an angle drilling and milling head with which axial end faces of the workpiece 18' can be worked, that is when the workpiece has not yet been severed from the material bar 18 by means of the circular saw 26, the end face lying on the right in FIG. 1, and when the workpiece has already been severed and gripped by means of the grippers 50, the end face exposed on the left in FIG. 1. In this case the grip unit 44 need not be pivotal.

FIG. 2 shows a variant of the invention in which a plurality of workpiece bars or rods 18 in a magazine can be fed to the drilling and milling machine. The machining can thus be automated in simple manner. Bar magazines and other feed means are known to the expert.

Figure 4B:
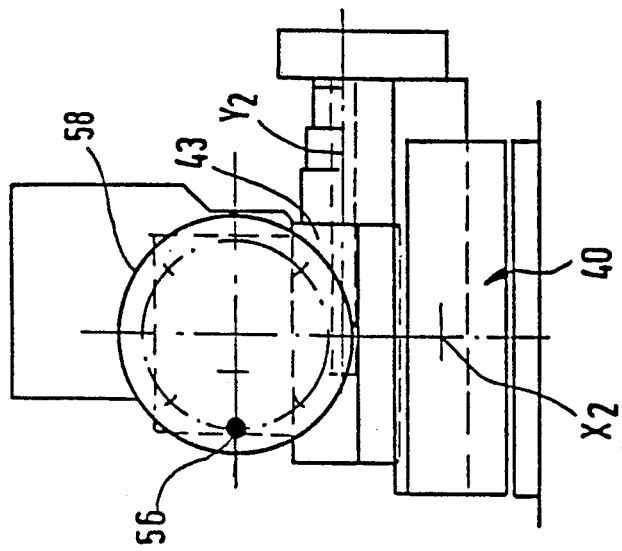
Figure 4A:
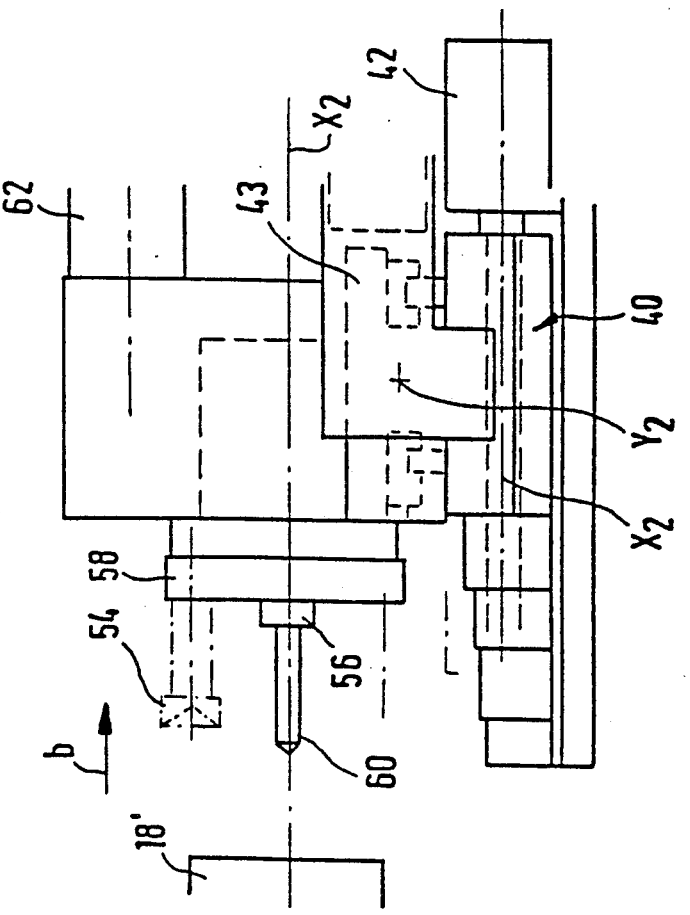
FIG. 4a is an enlarged fragment from FIG. 1 with further details.

FIG. 4a is a side view of the compound slide arrangement 40; FIG. 4b is a view in the direction of the arrow b in FIG. 4a. Instead of the grip and pivot unit 44 described, on the compound slide arrangement 40 a turret head 58 is mounted which carries a plurality of tool spindles 56 which are driven by a motor 62. The same motor 62 can be uncoupled from the tool spindles 56 and coupled to the turret head 58 to bring a respective tool, for example the tool 60, into working position.

With different tools (in the example of embodiment eight tools) such a turret head 58 can axially finish machine the free end side of the workpiece 18'. The radial machining carried out by means of the tool spindle 25 can be supplemented in this manner.

Thereafter the workpiece 18' is sawn off by means of the circular saw 26' (FIG. 1) and either carried away or transferred to the gripping and pivot unit 44 described above.

In FIG. 4a in dot-dash lines it is indicated that a tool spindle 56 can be locked and equipped with a counter holder 54 which supports the workpiece 18' at its exposed end. This is advantageous in particular with thin material bars 18.

I claim:

1. Drilling and milling machine comprising
    a workpiece carrier (30) which is formed for clamping a material bar (18) and is pivotal stepwise about a horizontal pivot axis (A) which coincides with the axis of the material bar (18) and
    at least one tool spindle (25) which has a spindle axis (Z) arranged at right-angles to the pivot axis (A) and is adjustable along said spindle axis (Z), characterized by
    a travelling pillar (20) which is displaceable in a direction (X axis) parallel to the pivot axis (A) and in a direction (Y axis) at right-angles to the pivot axis (A) and to the spindle axis (Z) and carries the tool spindle (25), and
    a severing unit (26) which is also arranged on the travelling pillar (20) and is constructed for severing a portion (18') of the material bar (18) which projects out of the workpiece carrier (30) into the working region of the tool spindle (25).

2. Drilling and milling machine according to claim 1, characterized in that the severing unit (26) is arranged on a slide (27) which is displaceably guided on the travelling pillar (20) at right-angles to the pivot axis (A).

3. Drilling and milling machine according to claim 1 or 2, characterized in that along the pivot axis (A) an additional slide (40) is movable which carries a counter holder (54) for additional supporting of the portion (18') of the material bar (18) projecting out of the workpiece carrier (30).

4. Drilling and milling machine according to claim 1 or 2, characterized in that along the pivot axis (A) a carriage is movable which carries a gripping and pivot unit (44) which via a chuck (50) grips the portion (18') of the material bar (18) projecting out of the workpiece carrier (30) and after cutting off said portion is pivotal about an axis (S) which intersects the pivot axis (A) of the workpiece carrier (30) at a right angle.

5. Drilling and milling machine according to claim 3, characterized in that on the additional slide arrangement (40), which is movable independently of the travelling pillar (20) in the same directions as the latter, a turret head (58) is arranged which carries at least one tool spindle (56).

* * * * *